United States Patent Office 3,118,902
Patented Jan. 21, 1964

3,118,902
BIS[1,2,3,5-OXATHIADIAZOLE]2,2'-DIOXIDES AND METHODS FOR PREPARING THE SAME
Edward E. Schmitt, South Norwalk, Conn., assignor to American Cyanamid Company, Stamford, Conn., a corporation of Maine
No Drawing. Filed Mar. 30, 1962, Ser. No. 183,717
6 Claims. (Cl. 260—306.7)

This invention relates to novel bis-1,2,3,5-oxathiadiazoles and to methods for the preparation of the same. More particularly, it relates to the preparation of certain 4,4'-arylene bis[1,2,3,5-oxathiadiazole] - 2,2'-dioxides wherein the three position on each of said oxathiadiazole rings is substituted by an aromatic or an aliphatic substituent.

The bis-1,2,3,5-oxathiadiazoles of the present invention find utility in agricultural applications, particularly as active ingredients in fungicidal compositions.

In general, the bis-1,2,3,5-oxathiadiazoles can be conveniently prepared by the reaction between an aromatic dinitrile oxide and a thionyl amine according to the equation:

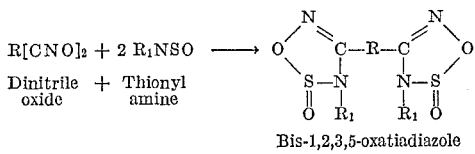

Bis-1,2,3,5-oxatiadiazole wherein R represents an arylene substituent, such as phenylene, naphthylene or halophenylene, the halo radical being fluorine, chlorine, bromine or iodine, and $R_1$ represents an alkyl substituent from 1 to 18 carbon atoms, an aryl or an haloaryl radical.

Advantageously, the thionyl amine and the dinitrile oxide are reacted in approximately equivalent proportions. Thus, two mols or more of the thionyl amine per mol of the dinitrile oxide can be conveniently reacted. However, for ease of operation, it is preferred to initially dissolve the thionyl amine in a suitable inert solvent, such as dimethylformamide or ether, and thereafter slowly adding the dinitrile oxide thereto at temperatures ranging from about 0° C. to below the boiling point of the solvent, usually from 0° C. to about 100° C., to recover the desired bis-1,2,3,5-oxathiadiazole derivative.

Illustrative aromatic dinitrile oxides which are employed in the process of the invention, are: 1,4-phenylene dinitrile oxide, 1,4-chlorophenylene dinitrile oxide, 1,3-(4-bromo)phenylene dinitrile oxide, 1,4-iodophenylene dinitrile oxide, 1,4-naphthylene dinitrile oxide and isomers of the same.

A wide variety of thionyl amine reactants can be utilized. These are, for instance, thionyl aniline, thionyl naphthyl amine, thionyl chloroaniline, thionyl bromoaniline, thionyl iodonaphthyl amine, thionyl butyl amine or thionyl dodecylamine.

In order to facilitate a further understanding of the invention, the following examples are presented primarily for purposes of illustrating certain more specific details thereof. The scope of the invention is not to be deemed limited thereby, except as defined in the claims. Unless otherwise noted, the parts are by weight.

EXAMPLE 1

*Preparation of 4,4'-p-Phenylenebis-[3-Phenyl-1,2,3,5-Oxathiadiazole]2,2'-Dioxide*

To 2.8 parts of thionyl aniline in 11 parts by volume of dimethylformamide are added in small increments over one and one-half hours 1.6 parts 1,4-phenylene dinitrile oxide in a suitable reaction vessel. The reaction mixture is gently stirred for about twelve hours.

Resultant reaction mixture is filtered and the product is washed with ether. Thereafter, it is dried and twice recrystallized from ethanol.

On infrared analysis, 4,4'-p-phenylenebis-[3-phenyl-1,2,3,5-oxathiadiazole]2,2'-dioxide, having a melting point of 158° C. to 159° C. is identified and obtained in a yield of 40% based on the theoretical. On further analysis, the following is found.

Calculated for $C_{20}H_{14}N_4O_4S_2$: C, 54.78%; H, 3.22%; N, 12.78%. Found: C, 54.99%; H, 3.27%; N, 12.68%.

EXAMPLE 2

The procedure of Example 1 is repeated in every detail, except that for the thionyl aniline 4.6 parts of thionyl dodecylamine are substituted in the reaction. The product, 4,4'-p-phenylenebis - [3-dodecyl - 1,2,3,5-oxathiadiazole]2,2'-dioxide, is soluble in solvents such as chloroform, acetone, ether and dimethylformamide and insoluble in cold hexane.

EXAMPLE 3

The procedure of Example 1 is repeated in every detail, except that 2.9 parts of thionyl butyl amine are employed in lieu of thionyl aniline. A substantially colorless solid product, 4,4' - p - phenylene-bis[3-butyl-1,2,3,5-oxathiadiazole]2,2'-dioxide, soluble in chloroform, acetone and ether, is obtained in good yield.

EXAMPLE 4

Repeating the procedure of Example 1 in every detail, except that for the thionyl aniline therein 2.1 parts of thionyl p-chloroaniline are substituted, on infrared analysis the product, 4,4'-p-phenylene-bis-[3-p-chlorophenyl-1,2,3,5-oxathiadiazole]2,2'-dioxide is obtained in good yield.

Similarly, 4,4' - p - phenylene - bis-[3-naphthyl-1,2,3,5-oxathiadiazole]2,2'-dioxide is obtained following the procedure above but substituting 2.8 parts of thionyl naphthylamine for the thionyl amine of the example. A product which does not melt below about 300° C. is obtained. It is also soluble in chloroform, ethanol or mixtures thereof.

The compounds of the present invention possess fungicidal properties. The following example illustrates this utility.

EXAMPLE 5

A standardized spore suspension is placed in a 50% water-acetone solution of each of the test compounds, prepared in the above examples, at a concentration of about 100 parts per million. The spores employed are obtained from the species *Monolinia fructicola* and *Stemphylium sarcinaeforme*. The spore germination is recorded after twenty-four hours incubation at 75° F. and 100% relative humidity. At that time, 92% to 98% kill of the spores is noted.

I claim:

1. A bis[1,2,3,5-oxathiadiazole]2,2'-dioxide of the formula:

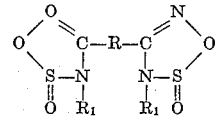

wherein R is a member selected from the class consisting of phenylene, naphthylene, monohalophenylene and monohalonaphthylene, and $R_1$ is a substituent selected from the group consisting of alkyl of from 1 to 18 carbon atoms, phenyl, naphthyl, monohalophenyl and monohalonaphthylene.

2. The compound: 4,4' - p - phenylene bis[3 - phenyl-1,2,3,5-oxathiadiazole]2,2'-dioxide.

3. The compound: 4,4'-p-phenylene bis[3-p-chlorophenyl-1,2,3,5-oxathiadiazole]2,2'-dioxide.

4. The compound: 4,4'-p-phenylene bis[3-dodecyl-1,2,3,5-oxathiadiazole]2,2'-dioxide.

5. The compound: 4,4'-p-phenylene bis[3-butyl-1,2,3,5-oxathiadiazole]2,2'-dioxide.

6. The process for preparing a bis-1,2,3,5-oxathiadiazole of the formula:

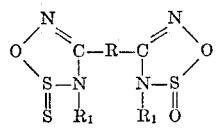

wherein R is a member selected from the class consisting of phenylene, naphthylene, monohalophenylene and monohalonaphthylene, and $R_1$ is a substituent selected from the group consisting of alkyl of from 1 to 18 carbon atoms, phenyl, naphthyl, monohalophenyl and monohalonaphthyl, which comprises: introducing one mol of a dinitrile oxide of the formula:

into a solution containing about two mols of a thionyl amine of the formula:

and an inert solvent therefor, wherein R and $R_1$ are defined as above; maintaining the resultant reaction mixture at a temperature below the boiling point of said solvent; and thereafter recovering so-formed bis[1,2,3,5-oxathiadiazole]2,2'-dioxide.

No references cited.